United States Patent [19]
Steigman et al.

[11] Patent Number: 5,597,123
[45] Date of Patent: Jan. 28, 1997

[54] ULTRA-HIGH ENERGY CRYOGENIC IMPACT SYSTEM

[75] Inventors: Frederic N. Steigman, Ossining, N.Y.; Rudolph H. Kohler, Danbury, Conn.; Robert B. Davis, Nyack, N.Y.

[73] Assignee: Praxair Technology, Inc., Danbury, Conn.

[21] Appl. No.: 497,654

[22] Filed: Jun. 30, 1995

[51] Int. Cl.⁶ .......................... B02C 19/00; B02C 19/12
[52] U.S. Cl. ...................... 241/23; 241/65; 241/DIG. 14; 241/DIG. 37
[58] Field of Search ..................... 241/65, 23, DIG. 14, 241/DIG. 31, DIG. 37

[56] References Cited

U.S. PATENT DOCUMENTS

| | | | |
|---|---|---|---|
| 4,102,503 | 7/1978 | Meinass | 241/18 |
| 4,340,076 | 7/1982 | Weitzen | 241/65 X |
| 4,645,131 | 2/1987 | Hailey | 241/23 |
| 5,011,087 | 4/1991 | Richardson et al. | 241/5 |
| 5,375,775 | 12/1994 | Keller et al. | 241/19 |

*Primary Examiner*—John M. Husar
*Attorney, Agent, or Firm*—Stanley Ktorides

[57] ABSTRACT

The present invention relates to ultra-high energy impact systems and processes for reducing the particle size of materials to an average diameter as small as about 40 μm. The systems include a cooling station for cooling the materials to a temperature within the range of from about −40° F. to about −450° F.; a milling station for reducing the particle size of the cooled materials, which station includes a rotor operating at a tip speed within the range of from about 600 to about 1500 feet per second; and an atmosphere modifier for modifying the gaseous atmosphere within the milling station.

10 Claims, 1 Drawing Sheet

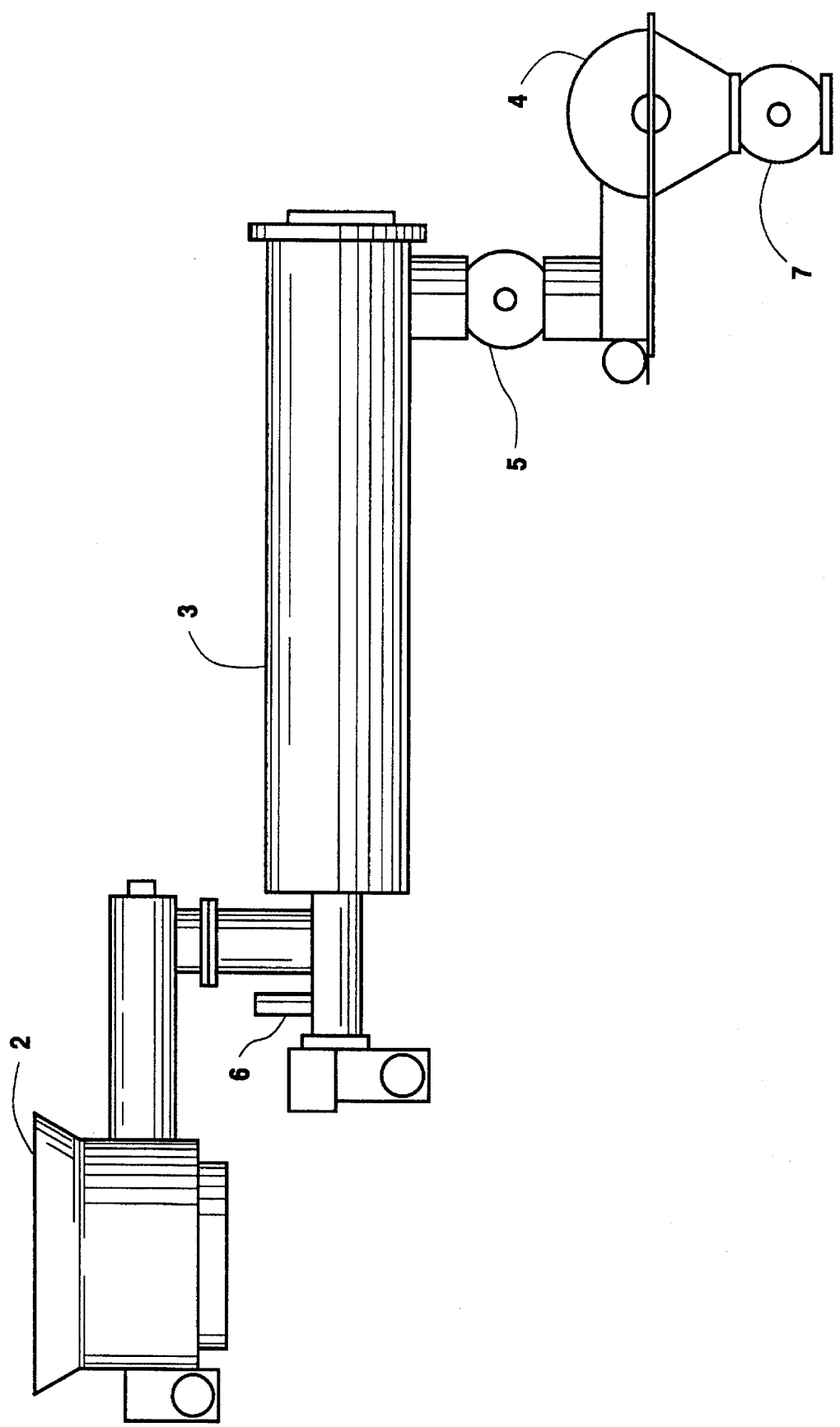

ULTRA-HIGH ENERGY CRYOGENIC IMPACT SYSTEM

FIELD OF THE INVENTION

This invention relates to ultra-high impact systems and processes, in which a milling operation is carried out at a reduced temperature and under a modified gaseous atmosphere. More particularly, this invention relates to such ultra-high energy impact systems and processes, in which the milling operation is carried out at a cryogenic temperature under a reduced pressure or a light gas atmosphere.

BACKGROUND OF THE INVENTION

Landfill shortages have made it increasingly more desirable to recycle materials heretofore disposed in landfills. For example, rubber tires and many plastic items are now being recycled for many new uses. One such use involves milling the recycled rubber or plastic, and mixing the resulting ground product with materials for paving roads. Indeed, U.S. federal legislation presently mandates the use of ground tire rubber in federally financed roads.

In conventional milling operations, including cryogenic milling operations, a rotor is used to provide the velocity or impact energy necessary to fracture the materials along microcracks or dislocations therein. For instance, rubber tire particles may be milled in a typical cryogenic hammermill to a ground rubber product, all of which is smaller than 30 U.S. mesh and 40% of which is smaller than 80 U.S. mesh. In order to achieve still smaller particle sizes, it is ordinarily necessary to increase the speed of the rotor within the mill so as to increase the impact energy imparted to the rubber particles. However, prior attempts to further reduce the particle size of material smaller than 30 U.S. mesh have resulted in lower throughput (i.e., pounds of material per hour through the mill) and in significantly higher consumption of the coolant, which is used to lower the temperature of the tire rubber particles to cryogenic levels.

In addition, the particle dislocations, which provide fracture sites and lead to brittle fracturing at relatively low impact velocities [less than about 400 feet per second ("FPS")], are often depleted at such a mesh size. Thus, further particle size reduction through the mechanism of brittle fracture requires greater rotor speeds to generate higher impact velocities. However, the speed at which the rotor moves is constrained by limitations of the material from which the rotor is constructed and the geometry or design of the rotor itself. For instance, at speeds approaching 600 to 800 FPS, conventional rotors will tend to shatter, and the bearings and seals used in connection with the rotor will tend to be destroyed.

A significant increase in rotor speed also causes increased windage or drag, leading to inefficiencies in the operation. More specifically, the increased windage reduces the power available to conduct the milling operation. For example, about 85 to 90% of the operating power of a mill whose rotor tip speed is about 600 FPS is consumed by windage.

Drag and friction created during operation of such mills also cause an increase in the temperature of the rotor and the temperature of the materials being milled. These temperature increases adversely affect the efficiency of the milling operation and the integrity of the milled materials.

It is known generally that, in high speed electrical machines having large diameter rotors, the inefficiencies caused by friction in air may be reduced by about 85 to 93% by conducting the operation in a hydrogen environment.

U.S. Pat. No. 4,645,131 discloses a powder mill which uses a vacuum to reduce the drag on metal powders. The powder mill of the '131 patent is said to mill the metal powders, which are cooled to a low temperature such as −100° F., to a particle size of smaller than 20 µm (625 U.S. mesh). The vacuum is reportedly used to reduce drag on the milled metal powders in an attempt to minimize interference with the milling operation, as particles of that size have little mass and the drag created under ambient conditions would tend to suspend the particles. In addition, the vacuum is used to combat the problem of metal oxidation, which occurs under atmospheric conditions and which becomes more pronounced as particle size decreases (and particle surface area increases).

One known mill, which was developed for heat-sensitive materials, is the Victory Mill, commercially available from Hosokawa Micron, Summit, N.J. This Hosokawa mill operates by impact pulverization, and is designed for coarse-to-medium size reduction of heat-sensitive materials (e.g., thermoplastics). This mill is also intended to be used without refrigerants and in an ordinary ambient atmosphere, though air cooling may be used. The rotor of the mill is designed to reduce friction between particles being milled, though it is not designed to operate at speeds approaching sonic.

Previously, where a particle size smaller than a certain mesh was desired, material exiting a mill could be passed through a screen or sieve of about that desired mesh to obtain material with a particle size smaller than that of the screen or sieve mesh. The remaining material (i.e., that which does not pass through the screen or sieve) could then be recycled into the feed material of that mill, or fed into a separate mill, for further size reduction. Such recycling creates inefficiencies in the milling operation insofar as the finer (i.e., smaller particle size) material tends to interfere with the milling of the larger particle size material. In addition, such use of a separate mill to further reduce particle size by a primary mechanism different than brittle fracture will decrease the throughput of the milled material. This results in increased expenditure (e.g., increased power consumption) to maintain the same degree of particle size reduction.

Another way in which particle size reduction is commonly carried out is wet milling, wherein horizontal serrated stone wheels and water dissipate the heat created during the grinding operation. However, with such a wet milling technique, water needs to be removed from the milled product. This plainly detracts from the efficiency of that technique.

Accordingly, there exists a need for an impact system which mills materials to fine particle sizes [such as to smaller than about 80 U.S. mesh (e.g., smaller than about 177 µm)], without encountering the inefficiencies referred to above. It would be desirable for such a system to mill materials under a modified gaseous atmosphere so as to reduce windage and friction resulting therefrom. It would also be desirable for such a system to mill materials with a rotor operating at high tip speeds, and to enhance the brittleness of the materials to be milled under reduced temperature conditions, particularly under cryogenic temperature conditions.

OBJECTS OF THE INVENTION

It is therefore an object of the invention to provide an ultra-high energy impact system, whose milling station operates under a modified gaseous atmosphere.

It is another object of the invention to provide such an ultra-high energy system, which cools the material to be milled, preferably to a cryogenic temperature, prior to milling.

It is a further object of this invention to provide a method for reducing the particle size of materials by cooling the materials prior to milling, and milling the cooled materials under a modified gaseous atmosphere.

SUMMARY OF THE INVENTION

The present invention relates to an ultra-high energy impact system for reducing the particle size of materials to an average diameter as small as about 40 μm, preferably within the range of about 125 μm to about 250 μm. The system includes a cooling station for cooling the materials to a temperature within the range of about −40° F. to about −450° F., preferably from −110° F. to about −320° F.; a milling station for reducing the particle size of the cooled materials, including a rotor operating at a tip speed within the range of from about 600 to about 1500 FPS, preferably at least 950 FPS, and in flow communication with and downstream of the cooling station; and an atmosphere modifier for modifying the gaseous atmosphere within the milling station.

The present invention also relates to a process for milling materials to a particle size as small as about 40 μm, preferably within the range of about 125 μm to about 250 μm. The process includes cooling the materials to a reduced temperature within the range of from about −40° F. to about −450° F., preferably from −110° F. to −450° F., transporting the cooled materials to a milling station, and milling under a modified gaseous atmosphere with a rotor which operates at a tip speed within the range of from about 600 to about 1500 FPS, preferably at least 950 FPS.

Preferably, the materials to be milled are tire rubber particles or thermoplastic particles and the cooling station reduces the temperature of those materials to a temperature of about −320° F. The atmosphere within the milling station is preferably at a reduced pressure substantially within the range of from about 20 inches to about 29.9 inches of mercury, or comprises a light gas, such as hydrogen or helium.

BRIEF DESCRIPTION OF THE DRAWINGS

Other objects, features and advantages of the present invention will occur to those skilled in the art from the following description of a preferred embodiment and the accompanying drawing, which is a schematic diagram of an ultra-high energy impact system according to the present invention.

DETAILED DESCRIPTION OF THE INVENTION

The ultra-high energy impact system of the present invention mills materials in an economical and efficient manner. More specifically, the ultra-high energy impact system of this invention mills materials to a reduced particle size as small as about 40 μm average diameter, preferably within the range of from about 125 μm to about 250 μm average diameter and more preferably about 177 μm average diameter, at a reduced temperature and under a modified gaseous atmosphere. Preferably, the milling station operates under cryogenic temperature conditions (such conditions being provided by the cooled materials to be milled), and under a reduced pressure atmosphere. The system and its operation are described in detail hereinafter.

With reference to the figure, materials to be milled are placed in a hopper 2. Suitable materials to be milled include, but are not limited to, metals (e.g., titanium, zinc and the like), plastics (e.g., thermoplastics such as polyacrylates, polycarbonates, polyethylenes, polypropylenes and the like, or thermosets such as epoxies), elastomers (e.g., rubbers) chemicals (e.g., sodium bicarbonate, manganese dioxide and the like), food items (e.g., nuts, dried fruits, citrus peels, cheeses, sugars and the like) and food-related items (e.g., spices), miscellaneous items (e.g., animal cartilage and animal organs) and the like. Particular examples include tire rubber, thermoplastics, thermosets and spices. Two preferred examples of materials to be milled are smaller than 4 U.S. mesh tire rubber particles and ⅛ inches polyethylene or polypropylene pellets.

A separate, independent feeder, such as a precision type feeder which is capable of providing a substantially constant mass flow (e.g., ±2%) of feed material, may be used as the hopper 2. The hopper 2 temporarily houses the materials to be milled and controls the feed rate of the materials to the cooling station 3 and ultimately to the milling station 4 of the system. The feed rate is the amount of materials measured by weight introduced to the cooling station 3. The feed rate remains substantially constant throughout the system, and is controlled so as to permit an appropriate amount of materials to pass into the cooling station 3 for sufficient cooling and thereafter to pass into the milling station 4 for efficient size reduction thereof. In practice, the feed rate may be established by observing the horsepower drawn by the milling station 4.

From the hopper 2, the materials may be fed by conventional feeding techniques (such as a screw conveyor feeder) to a cooling station 3, where the materials are cooled. In the cooling station 3, the temperature of the materials to be milled is reduced, thereby increasing brittleness and susceptibility to fracture. The temperature to which the materials are cooled in the cooling station 3 should be below the embrittlement or glass transition temperature of the material. For instance, with certain brittle materials (e.g., many thermosets such as epoxies) it may be sufficient to reduce the temperature thereof by air cooling, such as with air chillers, to a temperature slightly below ambient. With other materials (e.g., rubbers or thermoplastics), it may be more desirable to reduce the temperature of the materials to be milled to cryogenic levels.

In a preferred mode, the cooling station 3 is a cryogenic cooling station, in which materials to be milled are cooled to a cryogenic temperature within the range of from about −40° F. to about −450° F., with a temperature of about −320° F. being more preferred. Ordinarily, a liquified gas, such as liquid nitrogen, liquid helium, liquid oxygen, liquid argon or liquid carbon dioxide, will reduce the temperature to within that range. Solid carbon dioxide (also called dry ice) may also be employed. A preferred liquified gas is liquid nitrogen, where the temperature reached may be as low as −320° F.

In the cooling station 3, the materials to be milled may be cooled directly through a counter-current heat exchanger or cocurrent heat exchange with the coolant or refrigerant, such as liquid nitrogen, as is done in conventional cryogenic milling operations.

The cooling station 3 includes a vent 6, from which used refrigerant (e.g., air or vaporized gas, such as vaporized nitrogen gas, vaporized helium gas or vaporized argon gas) is vented. From a safety aspect, the vented gas should be collected and removed from the operating area.

The cooled materials are then fed, such as by gravity, to the milling station 4 through a gas tight rotary feedlock 5 or other suitable gas sealing device. The gas tight rotary feedlocks (5 and 7) are insulated and also seal the milling station 4 from the atmosphere so as to allow cooled material to enter (and exit after milling) but to prevent the loss of vacuum or escape of light gas and the introduction therein of ambient air. The insulation is important since the materials to be milled carry refrigeration from the cooling station 3 to the milling station 4. Because of the modified gaseous atmosphere under which milling is carried out in accordance with the present invention, no additional refrigerant need be supplied to the milling station 4. Since the materials to be milled pass through the milling station 4 in a finite residence time, it is advantageous for the cooling station 3 to efficiently cool the materials prior to entering the milling station 4. And, as noted above, such precooling may be accomplished through direct contact with refrigerant. This minimizes the loss of refrigeration as may occur if refrigeration were provided individually, for example through the housing of the stations in the system.

Also, as noted above, the milling station 4 of the system operates under a modified gaseous atmosphere. Preferably, that modified gaseous atmosphere is a reduced pressure atmosphere, such as a vacuum, which is maintained by a continuously operating vacuum pump (not shown). The vacuum pump should reduce the pressure within the grinding station to be substantially within the range of from about 15 inches to about 29.9 inches of mercury, preferably from about 20 inches to about 28 inches of mercury.

Alternatively, the modified gaseous atmosphere of the milling station 4 may be a light gas atmosphere. An appropriate light gas to carry out the present invention is hydrogen or helium.

The light gas may be introduced to the milling station 4 by initially evacuating the milling station 4 through the use of a vacuum pump (not shown) and then charging the milling station 4 with the light gas from an appropriate source. For instance, a vacuum pump may draw a vacuum of about 28 inches of mercury to evacuate air therefrom. By using an appropriate valve so as not to break vacuum and introduce ambient conditions therein, a light gas may then be introduced thereto. Alternatively, the ambient air in the milling station 4 may be displaced by the light gas, which may be introduced under a slight pressure (such as 5 inches of water) sufficient to so displace the ambient air. However, in a light gas atmosphere, windage reduction may not be as pronounced as in a reduced pressure atmosphere.

Within the milling station 4 is a rotor (not shown). The rotor may be cast, machined, welded and milled or fabricated from a variety of materials including, but not limited to, stainless steel, nickel steel, titanium (particularly where a high strength to mass ratio is desirable), and other alloys known to be suitable for cryogenic service. Preferably, the rotor has an aerodynamic geometry to minimize windage. The rotor hub, which supports the hammers or impact surface, has a disk- or flywheel-like shape, and is streamlined to minimize windage.

In operation, the rotor contacts the material with a sufficient force to provide an impact energy sufficient to fracture the material. For instance, the mill rotor operates with a tip speed within the range of from about 600 to about 1500 FPS, with a tip speed approaching sonic (e.g., about 950 FPS) being preferred.

The rotor shatters or fractures the material in the milling station 4. The shattered or fractured material then passes through a retaining screen or slotted discharge plate (not shown) within the milling station 4 before exiting that station. The screen may have a conventional design or may be custom-designed depending on the application. The retaining screen or discharge plate also acts to enhance the residence time of the material within the milling station 4, thereby creating a greater opportunity for the material to contact the rotor and be reduced to the desired particle size. The ground material then passes, such as by gravity, through another gas tight rotary airlock 7 to a collection chamber (not shown) at atmospheric pressure.

In a preferred mode, tire rubber particles (having a particle size of smaller than about 4 U.S. mesh) are cooled in the cooling station to a temperature below about −40° F. and desirably lower (such as to about −320° F.) using liquid nitrogen as the coolant. The cooled tire rubber particles are transported to the milling station, whose atmosphere has been modified to a reduced pressure (such as 28 inches of mercury). Within the milling station, the rotor operates at a tip speed as high as 1500 FPS, contact with which causes the cooled tire rubber particles to be reduced to a particle size having an average diameter preferably within the range of about 125 μm to about 250 μm, most preferably about 177 μm.

Specific features of the invention are shown in the figure for convenience only, as each feature may be combined with other features in accordance with the invention. Alternative embodiments will be recognized by those skilled in the art and are intended to be included within the scope of the claims.

What is claimed is:

1. An ultra-high energy impact system for reducing the particle size of materials to an average diameter as small as about 40 μm, comprising:
   (a) a cooling station for cooling said materials to a temperature within the range of from about −40° F. to about −450° F. by directly contacting said materials with liquid refrigerant;
   (b) a milling station for reducing the particle size of said cooled materials and which does not require cooling by refrigerant, said milling station including a rotor which operates at a tip speed within the range of from about 600 to about 1500 feet per second; and
   (c) an atmosphere modifier for modifying the gaseous atmosphere within said milling station.

2. The system according to claim 1, wherein said cooling station cools said materials to a temperature of about −320° F.

3. The system according to claim 1, wherein said atmosphere modifier reduces the pressure within said milling station to a pressure within the range of from about 20 inches to about 29.9 inches of mercury.

4. The system according to claim 1, wherein said atmosphere modifier causes said milling station to have a light gas atmosphere, said light gas being selected from the group consisting of hydrogen, helium and mixtures thereof.

5. The system according to claim 1, wherein said materials are selected from the group consisting of tire rubber, thermoplastics, thermosets, and combinations thereof.

6. A process for reducing the particle size of material to an average diameter as small as about 40 μm, said process comprising the steps of:
   (a) cooling said material to a temperature within the range of from about −40° F. to about −450° F. by directly contacting said material with liquid refrigerant; and
   (b) milling the resulting cooled materials in a modified gaseous atmosphere, at a milling station which does not require cooling by refrigerant, employing a rotor operating at a tip speed within the range of from about 600 to about 1500 feet per second.

7. The process according to claim 6, wherein said modified gaseous atmosphere is a reduced pressure within the range of from about 20 inches to about 29.9 inchs of mercury.

8. The process according to claim 6, wherein said modified gaseous atmosphere is a light gas atmosphere.

9. The process according to claim 8 wherein said light gas is selected from the group consisting of hydrogen, helium and mixtures thereof.

10. A process for reducing the particle size of material to an average diameter as small as about 40 µm, said process comprising the steps of:

(a) cooling said material to a temperature of about −320° F. by directly contacting said material with liquid refrigerant; and (b) milling the resulting cooled materials under a vacuum of about 28 inches of mercury, at a milling station which does not require cooling by refrigerant, employing a rotor operating at a tip speed of at least 950 feet per second.

\* \* \* \* \*